US008947595B1

(12) United States Patent
Tucker et al.

(10) Patent No.: US 8,947,595 B1
(45) Date of Patent: Feb. 3, 2015

(54) FINGERPRINTING TO MATCH VIDEOS HAVING VARYING ASPECT RATIOS

(75) Inventors: Richard Tucker, Zurich (CH); Henrik Rydgard, Zurich (CH); Gheorghe Postelnicu, Zurich (CH); Jasmine Kent, Zurich (CH); Michele Covell, Palo Alto, CA (US); Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1013 days.

(21) Appl. No.: 12/963,901

(22) Filed: Dec. 9, 2010

Related U.S. Application Data

(60) Provisional application No. 61/298,544, filed on Jan. 26, 2010.

(51) Int. Cl.
| | |
|---|---|
| *H04N 7/01* | (2006.01) |
| *H04N 11/20* | (2006.01) |
| *H04N 9/80* | (2006.01) |
| *G06F 7/04* | (2006.01) |
| *G06F 17/30* | (2006.01) |
| *H04N 7/16* | (2011.01) |
| *G06K 9/00* | (2006.01) |

(52) U.S. Cl.
USPC ............. 348/445; 386/252; 386/241; 726/26; 382/100

(58) Field of Classification Search
CPC . H04N 7/0122; H04N 7/0125; H04N 7/0105; H04N 2201/327
See application file for complete search history.

(56) References Cited

U.S. PATENT DOCUMENTS

| | | | | |
|---|---|---|---|---|
| 6,031,942 A | * | 2/2000 | Nakayama | ................... 382/284 |
| 2007/0253594 A1 | * | 11/2007 | Lu et al. | ...................... 382/100 |
| 2008/0040807 A1 | * | 2/2008 | Lu et al. | ......................... 726/26 |
| 2010/0104259 A1 | * | 4/2010 | Shakya et al. | .................. 386/94 |
| 2011/0026763 A1 | * | 2/2011 | Diggins | ....................... 382/100 |

* cited by examiner

*Primary Examiner* — Jefferey Harold
*Assistant Examiner* — Sean Haiem
(74) *Attorney, Agent, or Firm* — Fenwick & West LLP

(57) ABSTRACT

A combined fingerprint is generated for a video that can match two near-identical videos that differ only in their aspect ratios or formats. A transformation strategy is selected by selecting a first and a second aspect correction method. A first transformed video is generated by applying the first aspect correction method to the video. A second transformed video is generated by applying the second aspect correction method to the video. A first fingerprint is generated using the first transformed video. A second fingerprint is generated using the second transformed video. The combined fingerprint is generated by combining the first half of the first fingerprint with the second half of the second fingerprint.

18 Claims, 12 Drawing Sheets

Bin_A 340a (Partition=1, Position=1, Min-Hash Value=10) → Occurences = 23

Bin_B 340b (Partition=2, Position=1, Min-Hash Value=10) → Occurences = 15

First Fingerprint 450a  { [ (B3, 1) (A2, 2) (K12, 3) (G7,4) ]

Second Fingerprint 450b  { [ (J13, 1) (A2, 2) (K12, 3) (L32,4) ]

FINGERPRINTING TO MATCH VIDEOS HAVING VARYING ASPECT RATIOS

RELATED APPLICATIONS

This application claims the benefit of U.S. Provisional Application No. 61/298,544, filed Jan. 26, 2010, the content of which is incorporated by reference herein in its entirety

BACKGROUND

1. Field of Art

The invention generally relates to the field of video fingerprinting and, more particularly, relates to generating video fingerprints that can match multiple aspect ratios.

2. Description of the Related Art

Online video hosting services allow users to upload videos for viewing by other users. Over time, an online video hosting service can acquire a very large video database. Typically, some videos in the database are either exact or near-duplicates of other videos in the database. Accurately detecting near-duplicate videos within the database improves system performance, for example, including improving the ability of the online video hosting service to manage its video inventory, providing better searches, and overall faster response time.

Existing systems for detecting duplicate or near-duplicate videos in a database involve creating a fingerprint for each video in the database. Frequently, however, videos in the database contain multiple instances of a video content that differ primarily in their aspect ratios. For example, one user may upload a video that is in the 4:3 aspect ratio, while another user may upload the same video but in a 16:9 aspect ratio, or even a "squashed" 16:9 aspect ratio, where an original 16:9 video has been recorded in a 4:3 format. These situations make it more difficult to recognize the videos of different aspect ratios or formats as being the same video. Furthermore, where a video database already has a large collection of videos with associated fingerprints (which may result from videos with different aspect ratios), recreating the fingerprints for all of the videos in order to identify cross-aspect ratio matches would be costly and inefficient.

SUMMARY

A computer-implemented method generates a fingerprint based upon two different versions of a video, and which is able to match near-identical videos of different aspect ratios or formats. In one implementation, a computer-readable storage medium can store computer-executable code that, when executed by a processor, causes the processor to perform the method for generating a combined fingerprint of a video from two different aspect ratio versions of a video.

In one embodiment, a combined fingerprint is created for a video by combining one-half of each of two separate video fingerprints into a single fingerprint. A first fingerprint is generated from a first version of a video, and a second fingerprint is generated from second version of the video. One half (e.g. the first half) of the first fingerprint and a one half (e.g., the second half) of the second fingerprint are combined into a single combined fingerprint. The first version of the video can be obtained by transforming the uploaded video from its native aspect ratio and format, for example, widescreen, to a desired aspect ratio and format, for example, a 4:3 aspect ratio of full-screen format. The second version of the video can be the unaltered uploaded video. When the combined fingerprint is used later to match against fingerprints of other videos, it will match to both a fingerprint derived from a first version of the video as a well as a fingerprint derived from a second version of the video.

In one embodiment, a video is received with a first aspect ratio being a widescreen aspect ratio, such as 16:9, 2.35:1, 2.40:1 and so forth. This video is transformed into a first version of the video by cropping the video so as to have a second aspect ratio, such as 4:3. A first fingerprint is derived from the first version of the video, and a second fingerprint is derived from the widescreen version of the video. The one half of the first fingerprint is combined with the one half of the second fingerprint to create a combined fingerprint. The halves of the fingerprints are preferably combined to preserve their order. That is, when the first fingerprint is divided in half, the first half can be retained and the second half can be discarded, and when the second fingerprint is divided in half, the second half can be retained and the first half can be discarded. A resulting combined fingerprint that preserves order will comprise the first half of the first fingerprint followed by the second half of the second fingerprint.

When matched against existing fingerprints, one half of the combined fingerprint will match a half of a fingerprint derived from a cropped or 4:3 version of the video, while the one half of the combined fingerprint will match a half of a fingerprint derived from a widescreen version of the video. As an example, if all fingerprints are 100 bytes, then the first 50 bytes of the first fingerprint can be combined with the second 50 bytes of the second fingerprint. The result is a 100 byte fingerprint. When compared against a 100 byte fingerprint from a 4:3, cropped version of the video, the first 50 bytes of the combined fingerprint will match the first 50 bytes of the 100 byte cropped version's fingerprint. When compared against the 100 byte fingerprint derived from the widescreen version of the video, the second 50 bytes of the combined fingerprint will match the second 50 bytes of the widescreen version's fingerprint. As a beneficial result then, existing fingerprints that were previously created can be retained and used against newly created combined fingerprints.

In another embodiment, a video is received with a first aspect ratio. If the first aspect ratio is a widescreen aspect ratio, such as 16:9, 2.35:1, or 2.40:1, the video is transformed into a first version of the video by cropping the video so as to have an aspect ratio such as 4:3. Otherwise, the first version of the video is the unaltered video. A first fingerprint is derived from the first version of the video. The video is also transformed into a second version of the video by cropping the video, regardless of aspect ratio, so as to remove the left and rides sides of the video. A second fingerprint is derived from the second version of the video. The one half of the first fingerprint is combined with the one half of the second fingerprint to create a combined fingerprint.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

System Overview

Figure 1:
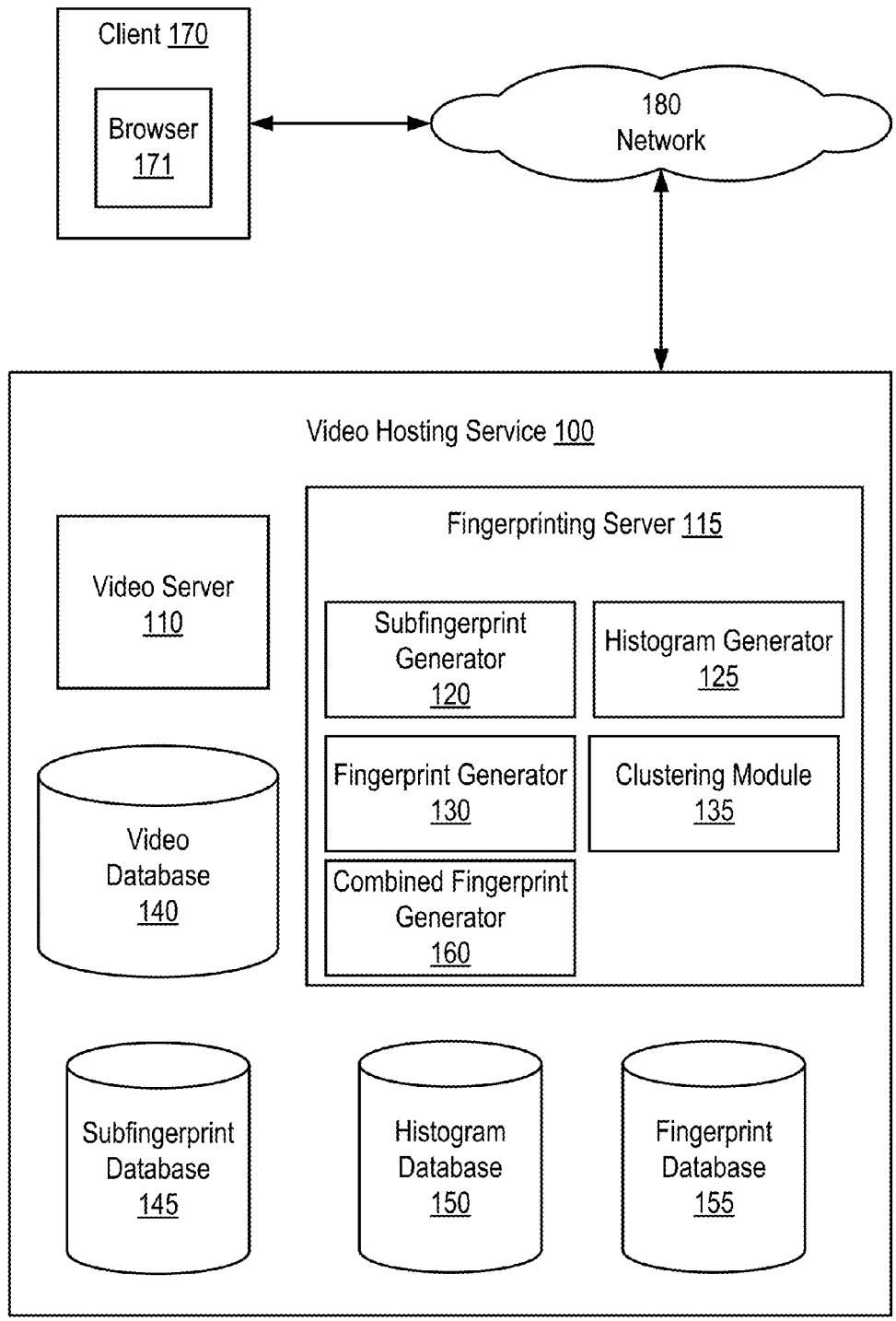
FIG. 1 illustrates a block diagram of one embodiment of a system for detecting near-duplicate videos within a video database using combined video fingerprints.

FIG. 1 illustrates an exemplary computing environment that supports a system for generating combined video fingerprints and detecting near-duplicate videos of different aspect ratios or formats within a video database using the combined video fingerprints. In the embodiment of FIG. 1, a video hosting service 100 communicates over a network 180 with one or more client devices 170, each client 170 including a browser 171. The video hosting service 100 comprises a number of modules including a video server 110, a fingerprinting server 115, a video database 140, a subfingerprint database 145, a histogram database 150, and a fingerprint database 155. The video hosting service 100 receives uploaded videos from some of the clients 170 and provides videos to clients 170 for viewing. The video hosting service 100 detects videos in the video database 140 that are duplicate or near-duplicate videos by creating and comparing combined video fingerprints. As used herein, a duplicate or near-duplicate video is a video stored by the video database 140 that is either identical or highly similar to at least one other video in the video database 140. For example, two or more near-duplicate videos in the video database 140 can appear more or less identical to a viewer (e.g., two different recordings of the same television show), but have bit-level differences due to variations in compression, de-compression, noise level, frame rate, start and stop times, source resolution, or aspect ratio.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable storage device (e.g., hard disk), loaded into the memory, and executed by one or more processors included as part of the video hosting service 100. Alternatively, hardware or software modules may be stored elsewhere within the video hosting service 100. The video hosting service 100 includes hardware elements necessary for the operations described here, including one or more processors, high speed memory, hard disk storage and backup, network interfaces and protocols, input devices for data entry, and output devices for display, printing, or other presentations of data.

The network 180 is typically the Internet, but can be any network, including but not limited to any combination of a LAN, a MAN, a WAN, a mobile, a wired or wireless network, a private network, or a virtual private network. Only a single client 170 is shown, but in practice there are many (e.g., millions) clients 170 that can communicate with and use the video hosting service 100. The browser 171 can include a content player (e.g., Flash™ from Adobe Systems, Inc.), or any other player adapted for the content file formats used by the video hosting service 100.

The video database 140, the subfingerprint database 145, the histogram database 150, and the fingerprint database 155 are communicatively coupled to the network 180 and can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here.

The video server 110 and the fingerprinting server 115 are also communicatively coupled to the network 180 and can be implemented as one or more server class computers. The server class computers can include one or more high-performance CPUs and 1 G or more of main memory, as well as 500 Gb to 2 Tb of storage. An open-source operating system such as LINUX is typically used. The operations of the video hosting service 100 as described herein can be controlled through either hardware (e.g., dedicated computing devices or daughter-boards in general purpose computers), or through computer programs installed in computer storage on the servers of the service 100 and executed by the processors of such servers to perform the functions described herein. One of skill in the art of system engineering and video analysis will readily determine from the functional and algorithmic descriptions herein the construction and operation of such computer programs.

In one embodiment, the video server 110 receives videos uploaded by clients 170 over the network 180 and processes them for storage by the video database 140. The video server 110 also receives requests for videos from clients 170 through the network. In response to received requests, the video server 110 retrieves videos stored by the video database 140 and distributes them to clients 170 over the network 180. Some of the videos received and distributed by the video server 110 are duplicate or near-duplicate videos.

The video database 140 stores data for a plurality of videos. Each video comprises video data that includes coded data for frames of the video. Typically, the coded data represents pixel values that determine the visual appearance of pixels of the video frames. The coded data depends on the underlying video and audio codecs used for encoding the videos, and for example includes video/audio transform coefficients, frame and window information, coding parameters, and so forth.

In one embodiment, the fingerprinting server 115 processes videos stored in the video database 140 to generate combined fingerprints, which represent the content in the full length of a video. The combined fingerprints are used to determine if a given video is a duplicate or near-duplicate of another video, and is capable of matching near-duplicate videos of different aspect ratios. The fingerprinting server 115 includes a subfingerprint generator 120, a histogram generator 125, a fingerprint generator 130, a combined fingerprint generator 160, and a clustering module 135.

Given a video for processing, the subfingerprint generator 120 divides the video into a plurality of segments and computes a plurality of corresponding subfingerprints. A subfingerprint is a data element that encodes data related to image and/or audio features of the corresponding video segment. In one embodiment, subfingerprints comprise min-hash values based on such features. The subfingerprint generator 120 can also create a subfingerprint array that comprises multiple subfingerprints for a video. Further details of the subfingerprint generator 120 as well as subfingerprints and subfingerprint arrays are provided below in reference to FIGS. 2A-2D, wherein example embodiments of a subfingerprint array and subfingerprinting methods are illustrated. Subfingerprints and subfingerprint arrays generated by the subfingerprint generator 120 are stored in the subfingerprint database 145.

The histogram generator 125 can receive subfingerprints from the subfingerprint generator 120 or can retrieve subfingerprints from the subfingerprint database 145. The histogram generator 125 first transforms multiple subfingerprints into a subhistogram. A subhistogram is a data element that encodes information about a number of occurrences for a particular subfingerprint feature in a plurality of subfingerprints (e.g., how many subfingerprints in the plurality of subfingerprints have the particular feature). A feature of a subfingerprint can be, for example, an element of a subfingerprint having a particular min-hash value. The histogram generator 125 can create multiple subhistograms for a single video.

The histogram generator 125 then transforms the data included in one or more subhistograms to generate a master histogram for the video. The master histogram encodes information about a number of occurrences for a particular subhistogram feature in the one or more subhistograms (e.g., how many subhistograms associated with the video have the particular feature). Subhistograms and master histograms generated by the histogram generator 125 are stored in the histogram database 150. Further details of the histogram generator 125 as well as subhistograms and master histograms are provided below in reference to FIGS. 3A-3D.

The fingerprint generator 130 transforms a master histogram for a video into a fingerprint for the video. In one embodiment, the fingerprint generated by the fingerprint generator is a fingerprint that encodes information about the entire video. This is in contrast to conventional segment-based techniques that generate fingerprints which encode information about only a portion of a video. The fingerprint generator 130 generates a video fingerprint by executing a hashing procedure that transforms the data within the master histogram for the video into a single data element representative of features of the entire video. Conventional video analysis techniques are typically applied to only a portion of a video because of the excessively large amount of data that would be produced by their application to the full length of the video. In one embodiment, a fingerprint generated by the fingerprint generator 130 for a video comprises a compact representation of the entire video. Hence, not only are features of the entire video encoded, but the amount of data related to an entire video is reduced relative to the mere application of conventional video analysis techniques to the entire video. The fingerprint generator 130, fingerprints, and the hashing algorithm are detailed below in reference to FIG. 5 in which an illustrative embodiment of a video fingerprint is included. Fingerprints generated by the fingerprint generator 130 may be stored in the fingerprint database 155.

The combined fingerprint generator 160 operates to create a fingerprint for a video that can match near-duplicate videos of different aspect ratios. In one embodiment, the combined fingerprint generator 160 uses the fingerprints generated in the manner described above, but the combined fingerprint generator 160 can use any fingerprinting method that yields fingerprints that can be successfully matched against a probe with only a 50% data match. Generally, the combined fingerprint generator 160 generates a fingerprint for a video by using two versions of the video having different aspect ratios. The aspect ratios of the two different versions include the native aspect ratio of the video (e.g., as uploaded by the user or content provider), and one or more aspect ratios resulting from the application of aspect correction methods to the uploaded video. The combined fingerprint generator 160 provides these two different versions of a video to the subfingerprint generator 120, which generates the corresponding subfingerprints, as described above, ultimately resulting in two different fingerprints by the fingerprint generator 130, which provides them to the combined fingerprint generator 160.

The combined fingerprint generator 160 creates a combined fingerprint by combining the first half of the first fingerprint with the second half of the second fingerprint. One way to combine the fingerprint halves is to concatenate the first half of the first fingerprint to the second half of the second fingerprint. The combined fingerprints are stored in the fingerprint database 155. The operation of one embodiment of the combined fingerprint generator 160 is described by FIG. 6.

One embodiment of the clustering module 135 operates upon fingerprints generated by the fingerprint generator 130 to match fingerprints that are substantially similar to each other using one or more data clustering procedures. The clustering module 135 can then identify videos associated with similar fingerprints as near-duplicate videos. In one embodiment, the clustering module 135 identifies a video associated as a near-duplicate video by appending or modifying metadata for the video included in the video database 140. The metadata can identify one or more other videos as near duplicates of the video. The metadata can also help the video hosting service 100, for example, provide improved searching and browsing capabilities (e.g., by not presenting to the user an excessive number of near-duplicate results in response to a query), propagate metadata among videos, or identify videos as suitable for various management policies (e.g., videos suitable for monetization via a particular advertisement or subscription policy, videos which should be eliminated from the database, etc.). In one embodiment, the clustering module 135 utilizes a type of Hamming distance metric for multiple fingerprints as part of identifying similar fingerprints. Details of the clustering module 135 and the data clustering procedures employed thereby are provided below in reference to FIG. 5.

Numerous variations from the system architecture of the illustrated video hosting service 100 are possible. The components of the service 100 and their respective functionalities can be combined or redistributed. For example, the video database 140, subfingerprint database 145, histogram database 150, and/or fingerprint database 155 can be distributed among any number of storage devices. Furthermore, the functionalities ascribed herein to any of the subfingerprint generator 120, histogram generator 125, fingerprint generator 130, clustering module 135, and combined fingerprint generator 160 can be implemented using a single computing device or using any number of distributed computing devices communicatively coupled via a network. For example, the fingerprint generator 130 and the combined fingerprint generator 160 could be readily combined into a single module. The following sections describe the subfingerprint generator 120, histogram generator 125, fingerprint generator 130, clustering module 135, and combined fingerprint generator 160 in more detail.

Moreover, in one embodiment, fingerprint generation using modules similar to subfingerprint generator 120, fingerprint generator 130 and combined fingerprint generator 160 may occur on a computer system or systems of a content provider. The content provider creates fingerprints of content (for example, one or more videos) and forwards the created fingerprint, and data identifying the content upon which the fingerprint is based, to video hosting service 100 for storage in fingerprint database 155. In some embodiments, multiple fingerprints that are created using different methods may be be sent for an individual piece of content. Such a system may be used when the content provider does not want to send the content itself to video hosting service 100.

Subfingerprint Generation

Figure 2A:
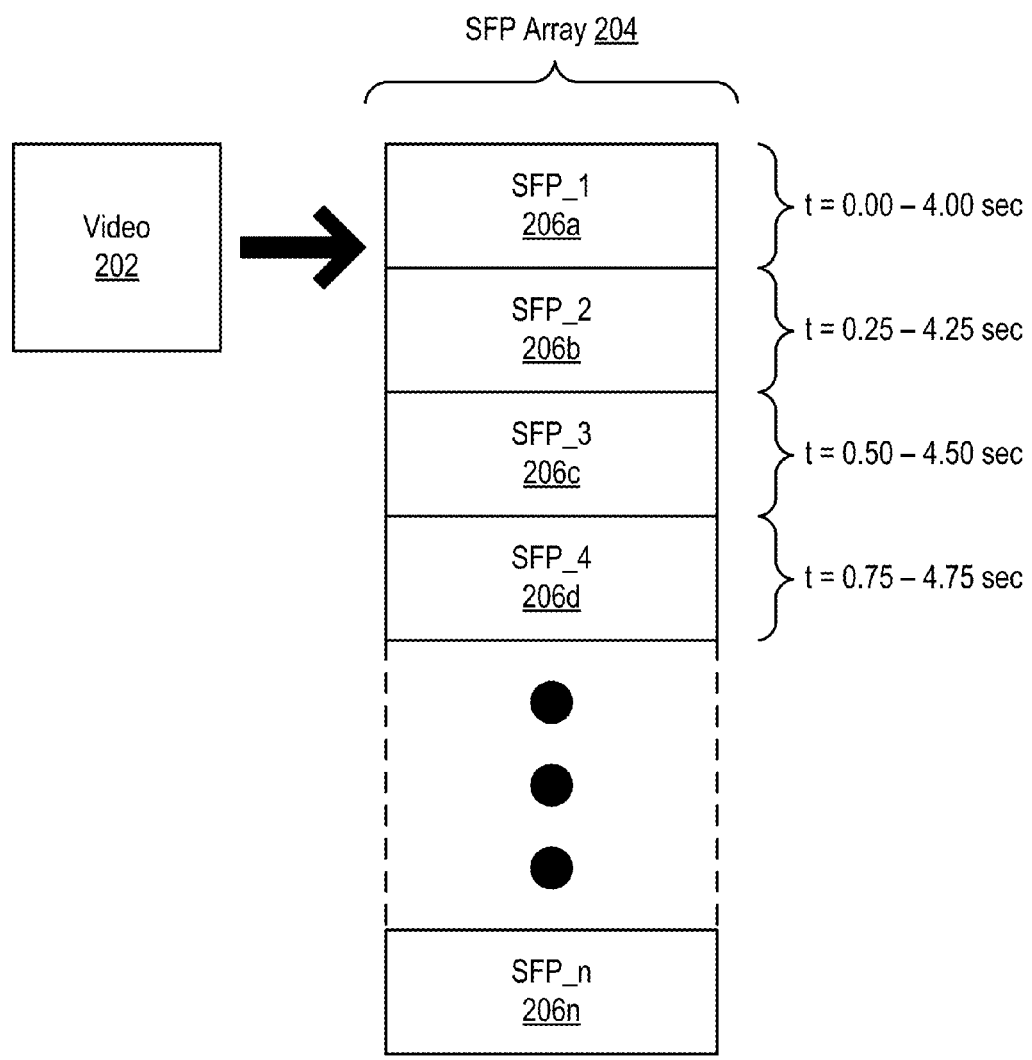
FIG. 2A illustrates an array of subfingerprints for a video in accordance with one embodiment.

FIG. 2A illustrates one embodiment of a subfingerprint (SFP) array 204 generated by the SFP generator 120. The SFP generator 120 receives a video 202 and transforms the associated video data into one or more subfingerprints 206. A subfingerprint 206 is a data element that characterizes a video segment by representing one or more image and/or audio features of the video segment in a compressed, non-reversible format. Each SFP 206 generated by one embodiment of the SFP generator 120 characterizes a corresponding four-second segment of the video 202. The four-second segments of the video overlap each other with a temporal offset of 0.25 seconds; the temporal offset can be made longer or shorter as needed. Hence, as illustrated in FIG. 2, a first SFP_1 characterizes the video 202 between 0.00 and 4.00 seconds on the playback timeline for the video 202, SFP_2 characterizes the video 202 between 0.25 and 4.25 seconds, a SFP_3 characterizes the video 202 between 0.50 and 4.50 seconds, and so on for the duration of the video 202. In other embodiments, other segment durations and segment offsets can be used. The SFP generator 120 can create an SFP array 204 for the video 202 that comprises all or a subset of the subfingerprints 206 created for the video 202. As is apparent then, the number of subfingerprints 206 for a video is a function of the length of the video, the temporal extent for the subfingerprint, and the amount of temporal overlap between subfingerprints.

Figure 2B:
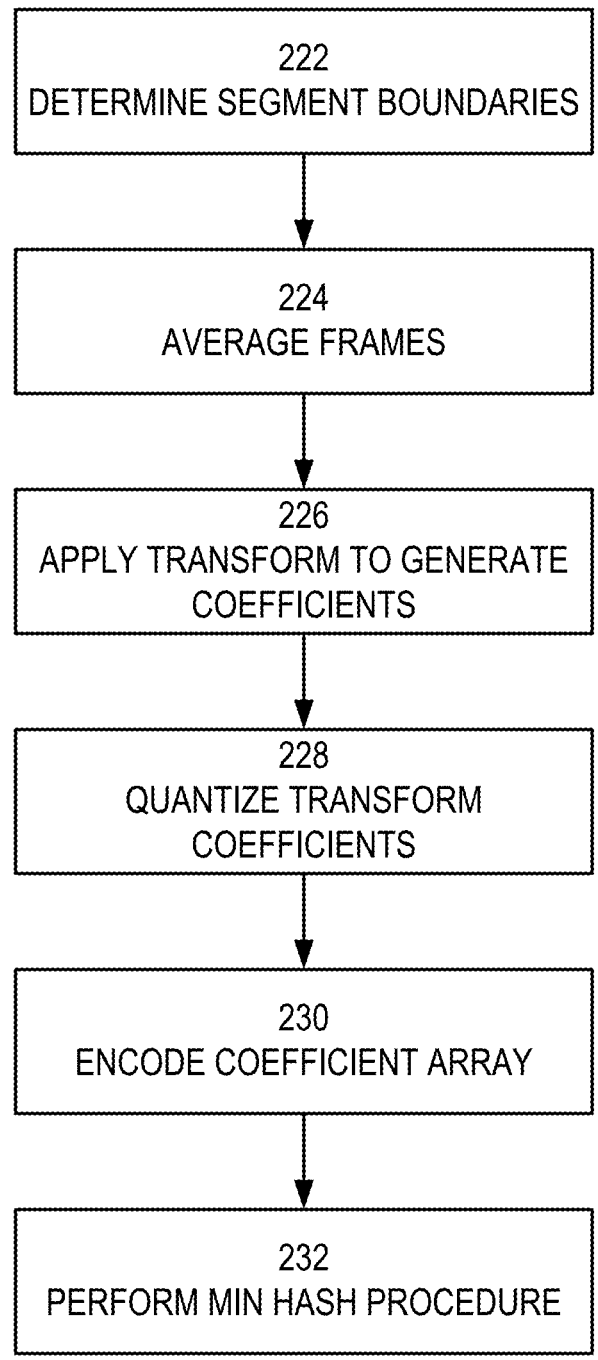
FIG. 2B illustrates one embodiment of a method for generating a subfingerprint for a video segment.

FIG. 2B is a flowchart illustrating the operations of the SFP generator 120 to generate an SFP 206 for a video segment according to one embodiment. Other embodiments can perform one or more steps of FIG. 2B in a different sequence. Moreover, other embodiments can include additional and/or different steps than the ones described herein.

The SFP generator 120 determines 222 boundaries for the segment. A boundary for the segment can comprise temporal boundaries (e.g., the start and stop times of the segment in terms of a playback timeline for the video 202) as well as spatial boundaries (e.g., borders for the video frames included in the segment). The SFP generator 120 can then average 224 video frames included in the video segment, transforming the data in the video segment into an average video frame with pixel data having average pixel values for the duration of the segment.

The SFP generator 120 transforms the video segment by applying 226 one or more transforms to the average video frame (or to all frames of the video segment in embodiments in which the averaging 224 step is omitted). A transform is a data processing operation that transforms given input video data (e.g., the averaged video frame) and outputs an array of coefficients which characterize spatial and temporal features of the input video data (e.g., edge locations and magnitudes, luminance features, and temporal gradients). The array of coefficients generated by applying 226 the transform can be either a single dimensional array or a multi-dimensional array. The coefficients can have both a magnitude and a sign. One embodiment of the SFP generator 120 applies 226 a Haar wavelet transform to the video segment. Other types of transforms can be applied 226 such as, for example, a Gabor transform or other related transform. The SFP generator 120 can apply 226 the above-listed or other transform techniques using boxlets, summed-area tables, or integral images. This step transforms the representation of the video from the pixel domain to the transform coefficient domain.

The SFP generator 120 then quantizes 228 the wavelet coefficients in the array. Various quantization techniques are possible. For example, in one quantization 228 process, the SFP generator 120 determines the N coefficients with the largest absolute values; N may be a predetermined number or may be determined dynamically based on various constraints. The SFP generator quantizes 228 the N coefficients to +1 or −1 by preserving the signs of the N coefficients and setting the remaining coefficients to zero. For example, in one embodiment there are 64 wavelet coefficients, and the SFP generator 120 preserves the signs of the largest 32 wavelet coefficients and sets the other 32 wavelet coefficients to zero. In a second example, coefficients are quantized 228 by comparing the magnitude of each coefficient to a predetermined threshold value. Any coefficient with a magnitude greater than the threshold value is quantized 228 to +1 or −1 by preserving its sign, and the remaining coefficients are quantized 228 to zero. In a third example quantization 228 process, constraints are placed on both the number of coefficients and their magnitudes. In this process, the SFP generator 120 quantizes 228 only the N greatest coefficients that have a magnitude greater than a threshold value to +1 or −1, and quantizes 228 the remaining coefficients to zero. As a result of any of these quantization processes, there is produced a coefficient array comprising sequence of −1, 0, and +1 values. This step further transforms the representation of the video into a data-independent domain of sign values.

In addition to the quantizing 228 process, the SFP generator 120 encodes 230 the quantized 228 coefficient array to a one-dimensional bit vector, reducing the dimensionality of the coefficient array if necessary. If, for example, each bit is quantized to +1, −1, or 0, a two-bit encoding scheme uses the bits 10 for +1, 01 for −1, and 00 for zero. Various other encoding 230 techniques are possible without departing from the scope of the invention. Quantizing 228 and encoding 230 the transform coefficients thereby creates a sparsely populated bit vector that retains the sign (e.g., positive or negative) of the selected N transform coefficients (e.g., those having a sufficiently large magnitude).

Figure 2C:
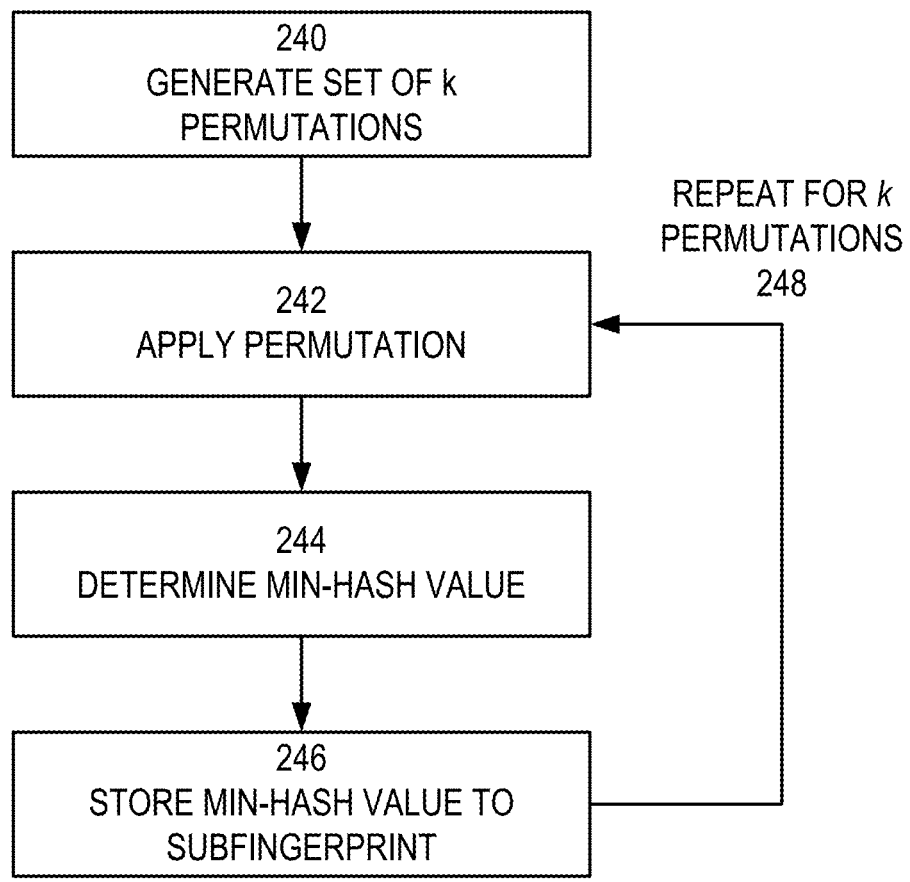
FIG. 2C illustrates one embodiment of a min-hash procedure.

The SFP generator 120 performs 232 a min-hash procedure on the bit vector to create an SFP 206 for the segment. FIG. 2C is a flow chart illustrating an embodiment of a min-hash procedure performed 232 by the SFP generator on a bit vector. First, a set of k permutations are generated 240. Each of the k permutations specifies a particular way of rearranging some elements (e.g., bits) of a bit vector. When a permutation is applied to a bit vector of length L, the permutation may be expressed as a sequence of integers between 1 and L in which the integers correspond to bit locations within the bit vector. Each such integer appears at most once in the permutation. Therefore, the permutation will have, at most, the length L. For example, when L=5, some valid permutations are (2,4,1, 5,3), (1,2,3,4), and (4,2,1). Using this representation, a permutation P=(2,4,1,5,3), for example, indicates that the $1^{st}$ bit of the re-arranged bit vector is assigned the value of the $2^{nd}$ bit of the input bit vector, the $2^{nd}$ bit of the re-arranged bit vector is assigned the value of the $4^{th}$ bit of the input bit vector, the $3^{rd}$ bit of the re-arranged bit vector is assigned the value of the $1^{st}$ bit of the input bit vector, and so on. For example, when rearranging the sequence "ABCDE" according to the permutation (4,2,1), the arrangement "DBA" is obtained, since the first element of the permutation is 4 and the $4^{th}$ entry of the sequence is "D", and so on. Each of the k permutations is applied 242 to re-arrange the bits of the bit vector to generate a set of k re-arranged bit vectors. Once generated 240, the permutations are typically fixed and applied 242 in the same order to each bit vectors on which the SFP generator 120 performs 230 the min-hash procedure.

The min-hash value is determined 244 as the position (offset) of the first non-zero value (e.g., 1) in the rearranged bit vector. For example, if the first non-zero value in a given re-arranged bit vector occurs in the $12^{th}$ position, then the min-hash value is 12. Different techniques can be used to handle cases where no non-zero value appears in the rearranged sequence. For example, in one embodiment, the min-hash value is set to a special value indicating that the bit vector is empty. The determined 244 min-hash value is then stored 246 as an element of the SFP 206, which in one embodiment comprises a single dimensional vector of min-hash values. This process of applying permutations and recording min-hash values then repeats 248 for each of the k permutations.

Thus, the SFP 206 includes k min-hash values, with each min-hash value indicating a position of the first bit value of "1" in the underlying bit vector after applying each permutation. In one embodiment, k is 100 and each SFP 206 produced by the SFP generator 120 comprises 100 min-hash values and represents four seconds of the video 202. Each min-hash value is encoded as a byte of data representing a number between 0 and 255. Hence, when k is 100, each SFP 206 is 100 bytes and includes 100 min-hash values. Other values of k are possible. Additionally, though each of the k min hash-values in an SFP 206 are primarily described herein as encoded using a single byte of data, a min-hash value can be encoded for a position using any amount of data. It should be appreciated at this point, that the described steps significantly reduce the amount of data necessary to represent the video of the segment. A four second segment of 640×480, 16 bit video takes 2,457,600 bytes of pixel data. Using the above methods, this same four second segment is now represented by just 100 bytes of data.

Figure 2D:
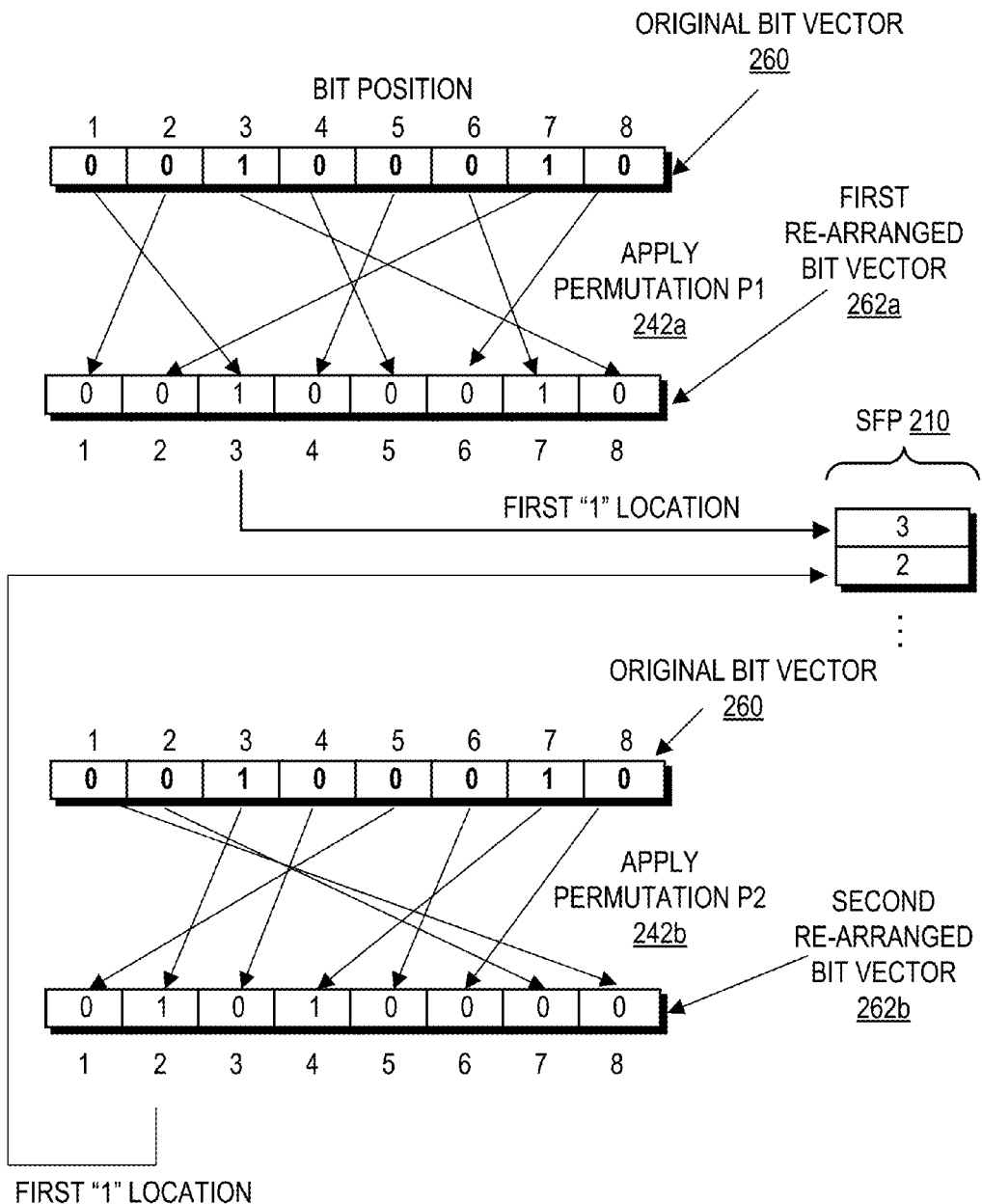
FIG. 2D illustrates the application of one embodiment of a min-hash procedure to a bit vector.

Turning now to FIG. 2D, the above-described processes of applying 242 a permutation and determining 244 a min-hash value are detailed for an example input bit vector 260 using example permutations P(1,1)={2,7,1,5,4,8,6,3} and P(2,1)= (5,3,4,7,6,8,2,1). As can be seen in the application 242a of P(1,1), the SFP generator 120 assigns the $1^{st}$ bit of the first re-arranged bit vector 262a to the value of the $2^{nd}$ bit of the original bit vector 260, the $2^{nd}$ bit of the first re-arranged bit vector 262a is assigned the value of the $7^{th}$ bit of the original bit vector 260, and so on. The SFP generator 120 then scans the re-arranged bit vector 304 for the location of the first "1". In the illustrated example, this location is found at bit position "3". Thus, the permutation module 114 records a min-hash value of "3" in the first entry (position) of the SFP 206. Next, the SFP generator 120 applies 242b a second permutation P(2,1) to the original bit vector 260 to yield a second re-arranged bit vector 262b. Again, the second re-arranged bit vector 262b is scanned for the location of the first "1" (in this case, position "2") and a min-hash value of "2" is recorded in the second position of the SFP 206. The process repeats for the remaining k permutations to generate the full SFP 206, which will therefore have k positions with each position having a min-hash value.

Using the same fixed set of permutations, subfingerprints 206 can be generated for a plurality of input vectors representing for example, multiple video segments for the video 202. The SFP generator 120 can repeat subfingerprinting process outlined in FIGS. 2A-2D for each video segment in the video 202. The ordered set of subfingerprints 206 generated form an SFP array 204 for the entire video 202. Subfingerprints 206 and SFP arrays are stored in the SFP database 145 or passed directly from the SFP generator 120 to the histogram generator 125.

Histogram Generation

Figure 3A:
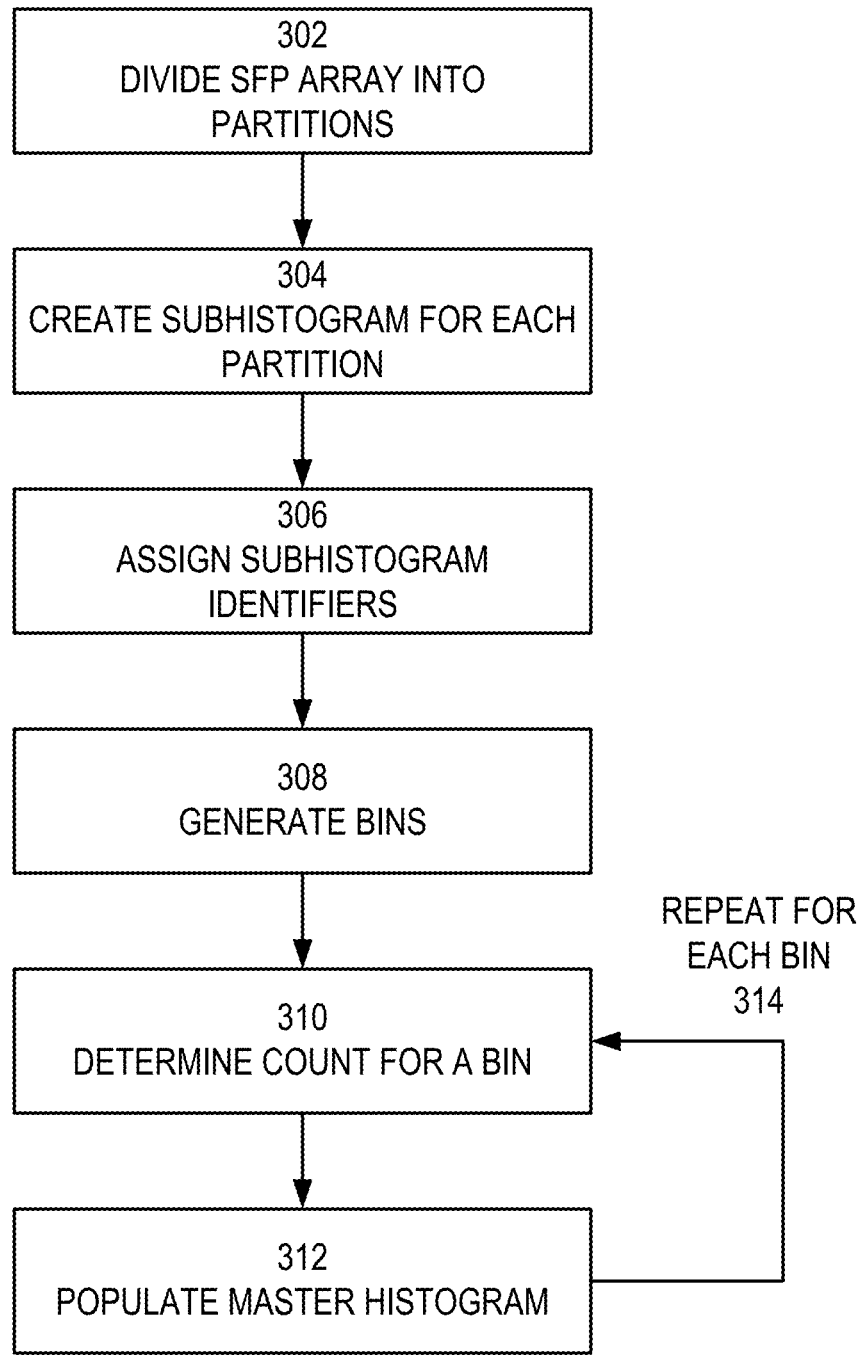
FIG. 3A illustrates one embodiment of a method for generating a master histogram for a video.
Figure 3B:
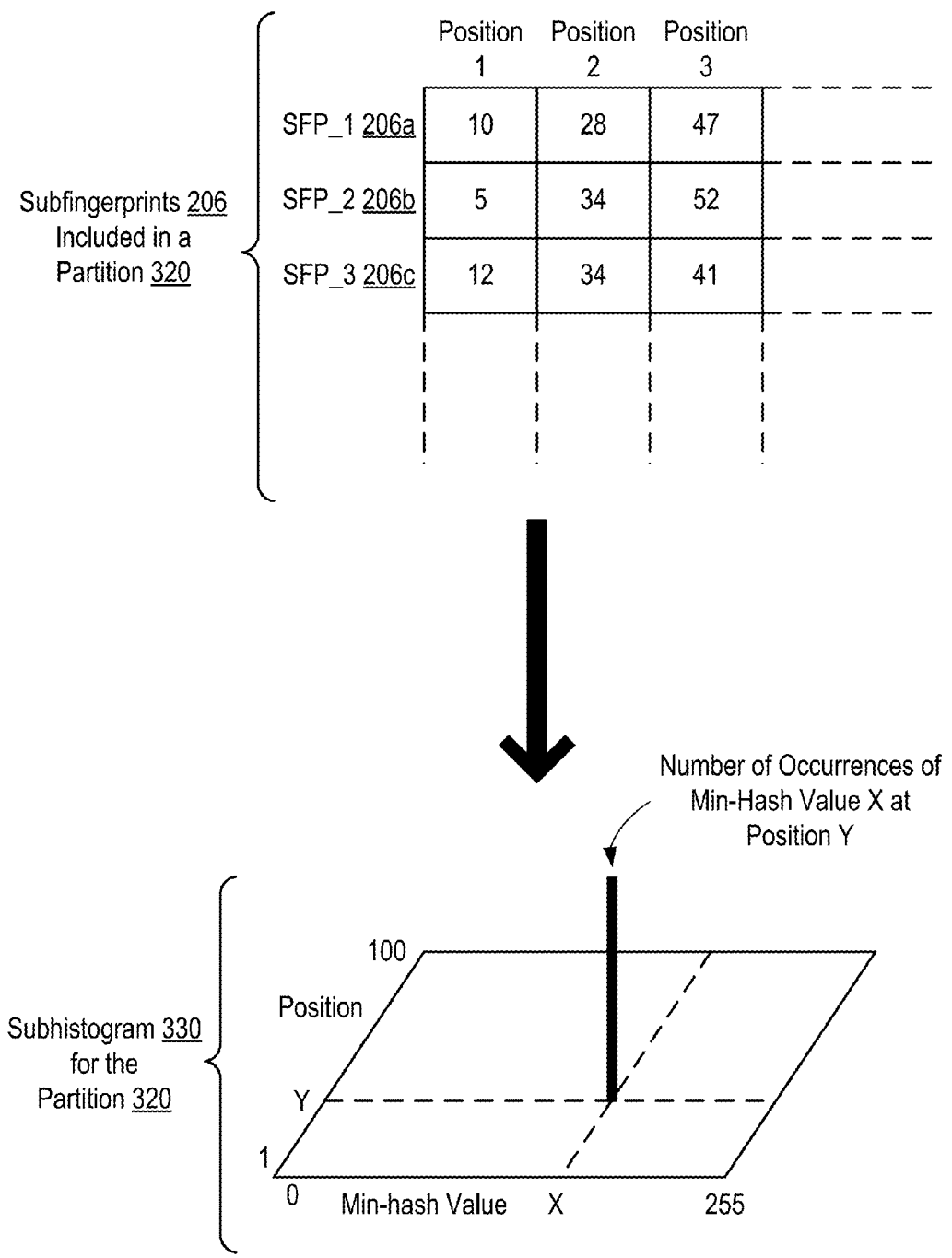
FIG. 3B illustrates aspects of one embodiment of a method for generating a subhistogram for a video from subfingerprints for the video.
Figures 3C, 3D:
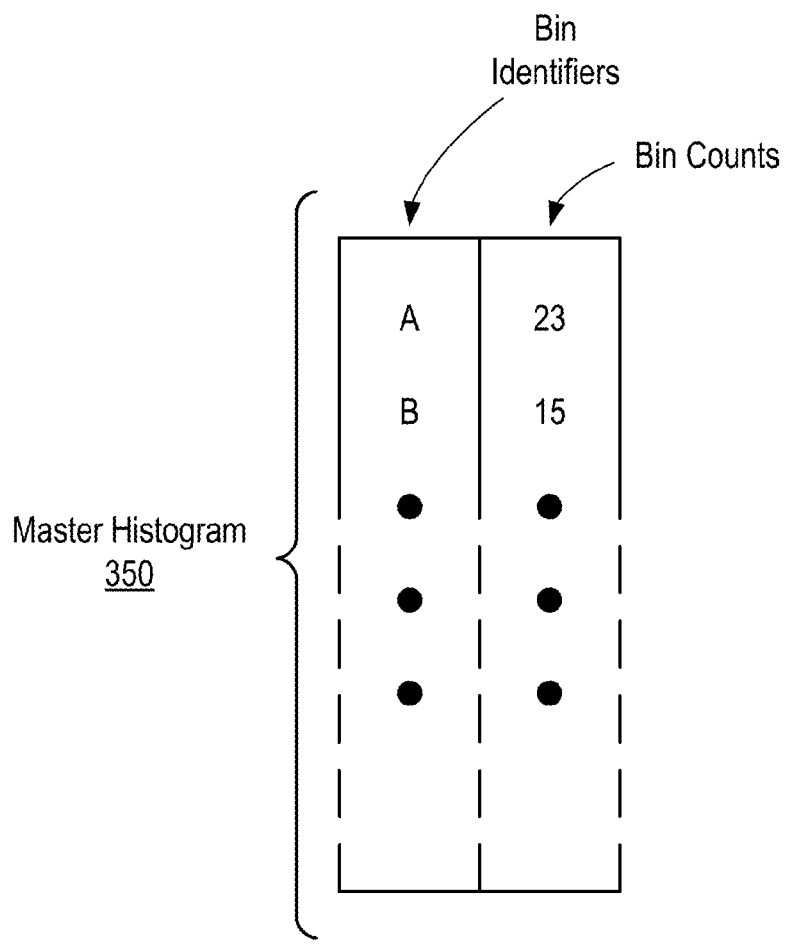
FIG. 3C illustrates master histogram bins for a video according to one embodiment.
FIG. 3D illustrates a master histogram for a video in accordance with one embodiment.

The histogram generator 125 transforms a plurality of subfingerprints 206 (e.g., an SFP array 204) into one or more subhistograms and then transforms one or more subhistograms into a master histogram for the video. FIG. 3A illustrates a flowchart of a method for generating subhistograms and a master histogram for the video 202 employed by one embodiment of the histogram generator 125. Other embodiments can perform one or more steps of FIG. 3A in a different sequence. Moreover, other embodiments can include additional and/or different steps than the ones described herein. FIG. 3B illustrates aspects of subhistograms 330 and subhistogram 330 generation according to one embodiment. FIGS. 3C and 3D illustrate aspects of master histograms 350 and master histogram generation according to one embodiment.

The histogram generator 125 divides 302 an SFP array 204 into one or more partitions 320 wherein each partition 320 comprises a number of subfingerprints 206. For example, in one embodiment, each partition 320 comprises one-hundred twenty subfingerprints 206. If each SFP 206 in the SFP array 204 has an offset of 0.25 seconds as illustrated in FIG. 2A, then a partition 320 comprising one-hundred twenty subfingerprints 206 characterizes thirty seconds of the video 202 (120*0.25 seconds=30 seconds). In one embodiment, a subhistogram 330 for a partition 320 is a three-dimensional data matrix that encodes how often a particular min-hash value occurs at a particular position of the subfingerprints 206 included in the partition 320.

Referring now to FIG. 3B, the first three positions of three subfingerprints 206 included in a partition 320 are illustrated. A small number of subfingerprints 206 and a small number of positions are illustrated for visual clarity. As indicated by the dashed lines in FIG. 3B, the subfingerprints 206 can include many more positions (e.g., 100) and the partition 320 can include many more subfingerprints 206 (e.g., 120). The SFP_1 has a first position with a min-hash value of 10, a second position with a min-hash value of 28, and a third position with a min-hash value of 47. The SFP_2 has a first position with a min-hash value of 5, a second position with a min-hash value of 34, and a third position with a min-hash value of 52. The SFP_3 has a first position with a min-hash value of 12, a second position with a min-hash value of 34, and a third position with a min-hash value of 41.

The histogram generator 125 creates 304 a subhistogram 330 that encodes how many times a particular min-hash value occurred at a given position in the subfingerprints 206 included the partition 320 (or, equivalently, how many times a particular position has a particular min-hash value). For example, in the partition 320 illustrated in FIG. 3, the min-hash value 34 occurs at the second position of at least two subfingerprints SFP_2, SFP_3 (or, equivalently, the second position of at least two subfingerprints SFP_2, SFP_3 has the min-hash value 34). Hence, in one embodiment, a subhistogram 330 is a three-dimensional array that includes a position dimension which varies from 1 to 100 (each SFP 206 having 100 positions), a min-hash value dimension which varies from 0 to 255 (each min-hash value encoded as a byte), and a number of occurrence dimension which varies from 0 to 120 (each partition 320 including 120 subfingerprints 206). In other embodiments, an SFP 206 can include a different number of positions, a min-hash value can be encoded for a position using a different amount of data, and a partition 320 can include a different number of subfingerprints 206.

The histogram generator 125 transforms a plurality of subhistograms 330 for a video 202 into a master histogram 350 for the video 202. The master histogram 350 encodes information about a number of occurrences for a particular subhistogram feature in the one or more subhistograms 330 (e.g., how many subhistograms 330 associated with the video have the particular feature). In one embodiment, the master histogram 350 is a concatenation of the one or more subhistograms 330 for the video 202. Thus, the master histogram 350 can encode a frequency of subfingerprint features for the full duration of the video 202 based on the information included in one or more associated subhistograms 330. The master histogram 350 therefore also encodes a frequency of SFP 206 features and, like a subhistogram 330, can include a position dimension, a min-hash value dimension, and a number of occurrences dimension. As detailed below, the master histogram 350 can also reduce any combination of dimensions included in a subhistogram to a single dimension by encoding the combination of dimensions as a tuple or other suitable identifier.

The histogram generator 125 assigns 306 an identifier to each subhistogram 330 identifying the partition 320 to which it corresponds. For example, a partition 320 corresponding to the first thirty seconds of the video 202 can be assigned 306 an identifier indicating that is a first partition 320a associated with the video 202, a partition 320 corresponding to the second thirty seconds of the video 202 can be assigned 306 an identifier indicating that is a second partition 320b associated with the video 202, and so on. Many varieties of partition 320 identifiers are possible.

The histogram generator 125 then generates 308 a plurality of bins 340, each bin 340 comprising a tuple of subhistogram 330 features. For example, in FIG. 3C, a first bin 340a corresponds to a three-element tuple {Partition=1, Position=1, Min-hash Value=10} in which the first element identifies a first partition 320a, the second element identifies the first position in the partition, and the third element indicates a min-hash value of 10 at this position. Similarly, a second bin 340b corresponds to a three-element tuple in which the first element indicates a second partition 320b, the second element indicates a first position, and the third element indicates a min-hash value of 10. As part of defining 308 the bins 340, the histogram generator 125 can assign a bin identifier to each bin 340. For example, in the histogram 350 of FIG. 3C, the first bin 340a is assigned the identifier "A" and the second bin 340b is assigned the identifier "B". The dashed lines and vertical dots included in the histogram 350 indicate that more bins 340 have been defined 308 and assigned a corresponding identifier but are not shown to preserve illustrative clarity. In other embodiments, a bin identifier for a bin 340 can be the tuple corresponding to the bin 340 or any other manner of identifier suitable for uniquely denoting the bin 340.

The histogram generator 125 determines 310 a count for each bin 340 and populates 312 the histogram 350 with the determined 310 count. For example, in FIGS. 3C and 3D, the histogram generator 125 has determined 310 a count of "23" for the first bin 340a, indicating that in the subhistogram 330 corresponding to the first partition 320a, 23 of the subfingerprints 206 included in the first partition 320a were found to have a first position with a min-hash value of 10. The histogram generator 125 has also determined 310 a count of "15" for the second bin 340b, indicating that in the subhistogram 330 corresponding to the second partition 320b, 15 of the subfingerprints 206 included in the second partition 320b were found to have a first position with a min-hash value of 10. Thus, in one embodiment, determining 310 a count for a bin 340 comprises concatenating the number of occurrences dimension of the subhistograms 330 included in the bin 340.

The histogram generator 125 repeats 314 the determining 310 and populating 312 steps for each defined 308 bin 340 associated with the video 202 to complete the histogram 350 for the video. Hence, in one embodiment, the histogram 350 is a multi-dimensional array that encodes how many times a particular set of subhistogram 330 features occurs in association with a video 202 (e.g., how many times did the first position of an SFP 206 have a min-hash value of 10 in the first partition 320a associated with the video 202).

Bins can be generated 308 using a tuple of any type of combination of subhistogram 330 elements. For example, a bin can be generated 308 for multiple positions within the subfingerprints 206 in a partition 330. One example is a five-element tuple such as {Partition=1, First Position=1, First Min-Hash Value=10, Second Position=2, Second Min-Hash Value=17} in which the first element indicates a first partition 320a, the second element indicates a first position, the third element indicates a first min-hash value of 10, the fourth element indicates a second position, and the fifth element indicates a second min-hash value of 17. The example bin would therefore have a count that reflects a first number of occurrences for subfingerprints 206 in the first partition 320a with a first position having a min-hash value of 10 plus a second number of occurrences for subfingerprints 206 in the first partition 320a with a second position having a min-hash value of 17. The histogram generator 125 would therefore determine 310 the corresponding count based on the entries in the subhistogram 330 for the first partition 320a. Subhistograms 330 and histograms 350 are stored in the histogram database 150 or passed directly from the histogram generator 125 to the fingerprint generator 130. One embodiment of the histogram generator 125 generates only a single subhistogram 330 for a video 202, and the master histogram 350, being a concatenation of subhistograms 330 for the video, merely comprises the information in the single subhistogram 330.

Fingerprints

Figure 4A:
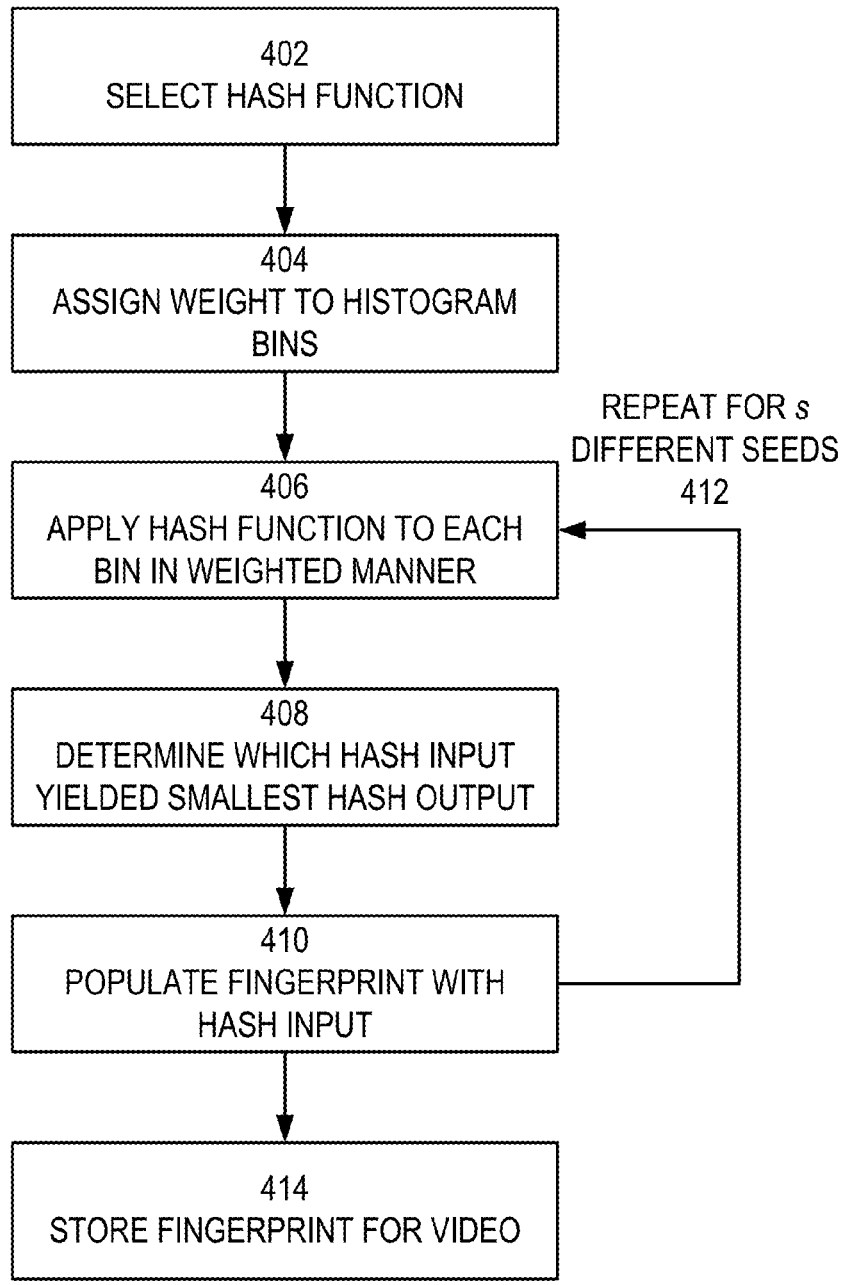
FIG. 4A illustrates one embodiment of a method for generating a fingerprint for a video from a master histogram for the video.

The fingerprint generator 130 transforms data included in a histogram 350 for a video 202 into a fingerprint for the video 202. In one embodiment, the fingerprint generator 130 applies a weighted min-hash procedure to the histogram 350 to generate the fingerprint. FIG. 4A illustrates a flowchart of one embodiment of a weighted min-hash procedure 400 implemented by the fingerprint generator 130. Other embodiments can perform one or more steps of FIG. 4A in a different sequence. Moreover, other embodiments can include additional and/or different steps than the ones described herein.

First, the fingerprint generator 130 selects 402 a hash function to apply to the histogram 350 data. The selected 402 hash function can be a conventional hash function such as, for example, a Jenkins hash function, a Bernstein hash function, a Fowler-Noll-Vo hash function, a MurmurHash hash function, a Pearson hashing function, or a Zobrist hash function. The selected 402 hash function is a seeded hash function. A seeded hash function can be described as a function that accepts two inputs, e.g., f(X, Y). The first input X is a set of data (e.g., 32 bits of data), and the second input Y is a seed value. The seed value is typically a number (e.g., 1, 2, 3 . . . ). The selected 402 hash function treats X and Y as a pair, outputting a hash value that is affected by both X and Y. The output of the hash function is a single real number, such as an integer.

The fingerprint generator 130 then assigns 404 a weight w to each bin 340 included in the histogram 350. In one embodiment, the weight 404 assigned to a bin 340 is the count associated with the bin 340. Hence, referring the histogram 350 of FIG. 3D, the fingerprint generator 130 would assign 404 a weight w=23 for the bin 340 identified as "A", would assign 404 a weight w=15 for the bin 340 identified as "B", and so on until each bin 340 of the histogram 350 has been assigned 404 a weight. The weight assigned 404 to a bin 340 can also be a transform of the associated count (e.g., a square root of the count). The assigned 404 weight can also be constrained between a minimum value and a maximum value to limit the influence of any individual bin 340.

The fingerprint generator 130 applies 406 the selected 402 hash function to each bin 340 in a weighted manner. The data from a bin 340 that is input to the applied 406 hash function comprises a sequence of bits representative of the bin 340. For example, in one embodiment, the data for a bin 340 that is input to the applied 406 hash function comprises a 64-bit sequence obtained by representing each of the partition 320, the subfingerprint position and the min-hash value associated with the bin 340 as a number and then applying a hash (e.g., Jenkins hash) to the three numbers to generate a 64-bit sequence. In another embodiment, the bin 340 is treated as a string of ASCII characters (e.g., the ASCII characters corresponding to "partition 1, subfingerprint position 4, minhash value 10"), with the hash function applied 406 to the string. Also, data for the bin 340 can serve to initialize a random number generator, such as a linear congruential generator, and the output of the random number generator can comprise a sequence of bits to which the hash function is applied 406.

In one embodiment, applying 406 the hash function to a bin 340 in a weighted manner comprises applying 406 the hash function with a constant seed value to w versions of the bin 340. For example, the fingerprint generator 130 can apply 406 the selected 402 hash function to 23 versions of bin A, can apply 406 the selected 402 hash function to 15 versions of bin B, and so on until the hash function has been applied 406 to one or more versions of each bin 340 of the histogram 350, the number of versions for a bin 340 equal to the assigned 404 weight w. In one embodiment, a first version of a bin 340 is a first permutation of the data included in the bin 340, a second version of the bin 340 is a second permutation of the data included in the bin 340, and so on. The concept of permutations (bit-swaps) and their application was described above in reference to FIGS. 2C and 2D. In another embodiment, a first version of a bin 340 is created by appending an entry of "1" to the data included in the bin 340, a second version of the bin 340 is created by appending an entry of "2" to the data included in the bin 340, and so on.

After applying 406 the selected 402 hash function in a weighted manner, the fingerprint generator 130 determines 408 which input to the hash function resulted in the smallest output and populates 410 the fingerprint with the determined 408 hash input. The fingerprint generator 130 then repeats the applying 406, determining 408, and populating 410 steps for a number s of different seeds for the selected 402 hash function. Once the fingerprint is fully populated 412, the fingerprint generator 130 stores the created fingerprint in the fingerprint database 155.

Figure 4B:
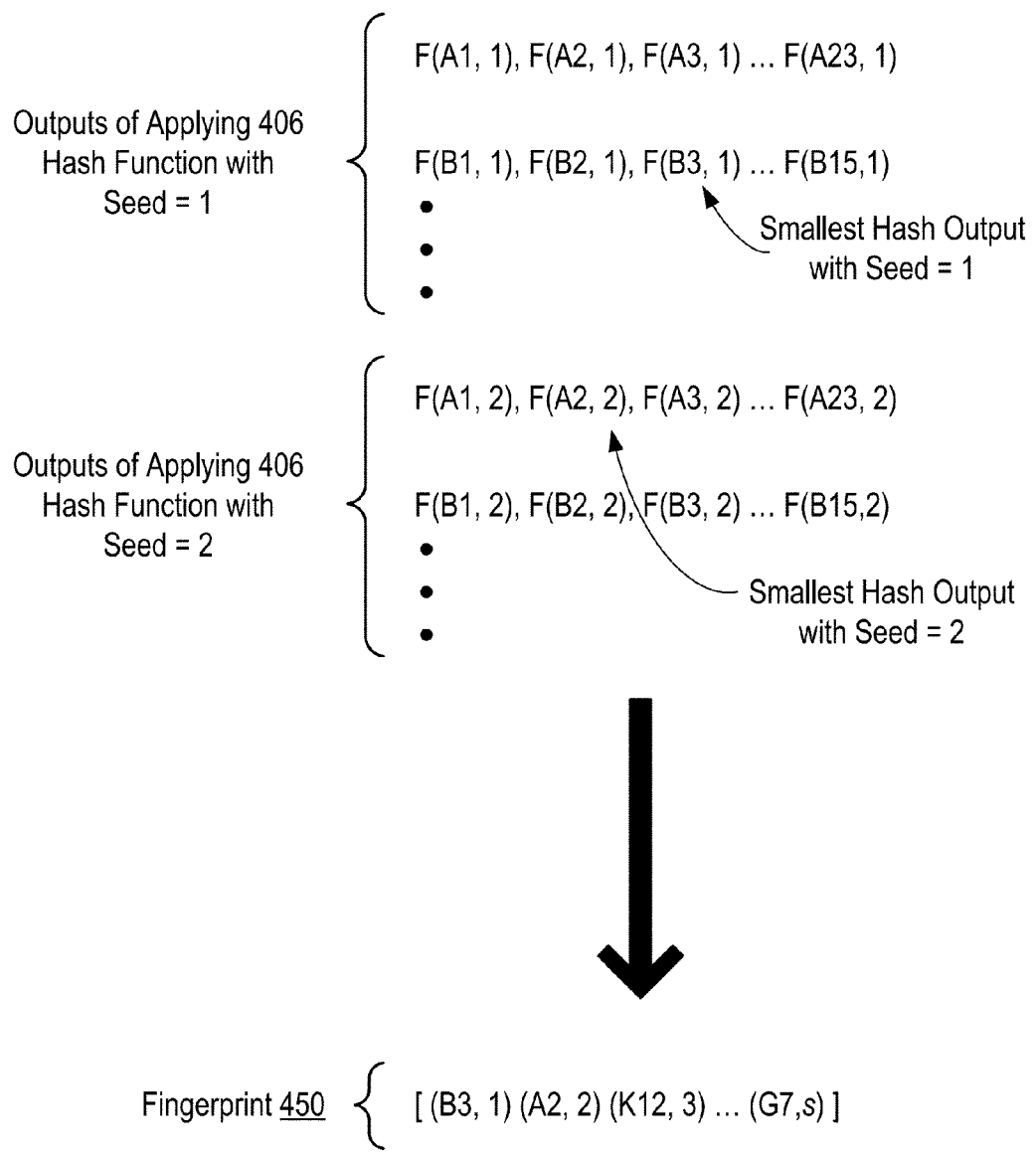
FIG. 4B illustrates aspects of one embodiment of a method for generating a fingerprint for a video from a master histogram for the video.

FIG. 4B illustrates aspects of the weighted min-hash procedure 400 depicted in FIG. 4A as applied to the example histogram 350 of FIG. 3D and includes an example fingerprint 450. In FIG. 4B, "F(A1, 1)" indicates the output of the selected 402 hash function for inputs "A1" and "1" wherein A1 is a first version of bin 340 A and "1" is a seed value, "F(A2, 1)" indicates the output of the selected 402 hash function for inputs "A2" and "1" wherein A2 is a second version of bin 340 A and "1" is a seed value, and so on. The output of the applied 406 hash function comprises a single number, and in one embodiment is a 32-bit number.

As shown in FIG. 4B, applying 406 the selected 402 hash function to w versions of each bin 340 of the histogram 350 can result in a very large number of hash outputs. For example, there are 23 hash outputs for bin A, 15 hash outputs for bin B, and so on for each of the s seeds. For visual clarity, a few hash outputs are illustrated in FIG. 4B, but as indicated by the ellipsis and vertical dots, applying 406 the selected 402 hash function to w versions of each bin 340 of the histogram 350 can result in many more hash outputs.

As previously described, the fingerprint generator 130 determines 408 which hash input resulted in the smallest hash output and populates the fingerprint 450 with that determined 408 hash input. In FIG. 4B for example, a case is illustrated in which applying 406 the selected 402 hash function in a weighted manner with a constant seed of 1 yielded the smallest hash output when the other input was the third version of bin 340 B. Hence, the first entry of the fingerprint 450 encodes the tuple (B3, 1). In the case illustrated by FIG. 4B, applying 406 the selected 402 hash function in a weighted manner with a constant seed of 2 yielded the smallest hash output when the other input was the second version of bin 340 A, the second entry of the fingerprint 450 therefore encodes the tuple (A2, 2). Ultimately, the fingerprint generator 130 repeats the applying 406, determining 408, and populating steps 410 s times with s different seeds. A fingerprint 450 for the video 202 is therefore a vector comprising s entries wherein each entry encodes which version of which bin 340 resulted in the smallest hash function output for the corresponding seed. In one embodiment, s is eighty, and eight bytes is used to encode each entry, so the fingerprint 450 comprises 640 bytes (eight entries at eight bytes each). Other values of s are possible, and each entry of the fingerprint 450 can be encoded using a different amount of data.

Thus, in one embodiment the fingerprint 450 comprises a single data element that represents features of throughout the entire duration of the video 202. Although the video 202 can comprise several tens or even hundreds of megabytes of data, the video fingerprint 450 can be only tens or hundreds of bytes.

Combined Fingerprint Generation

Figure 6:
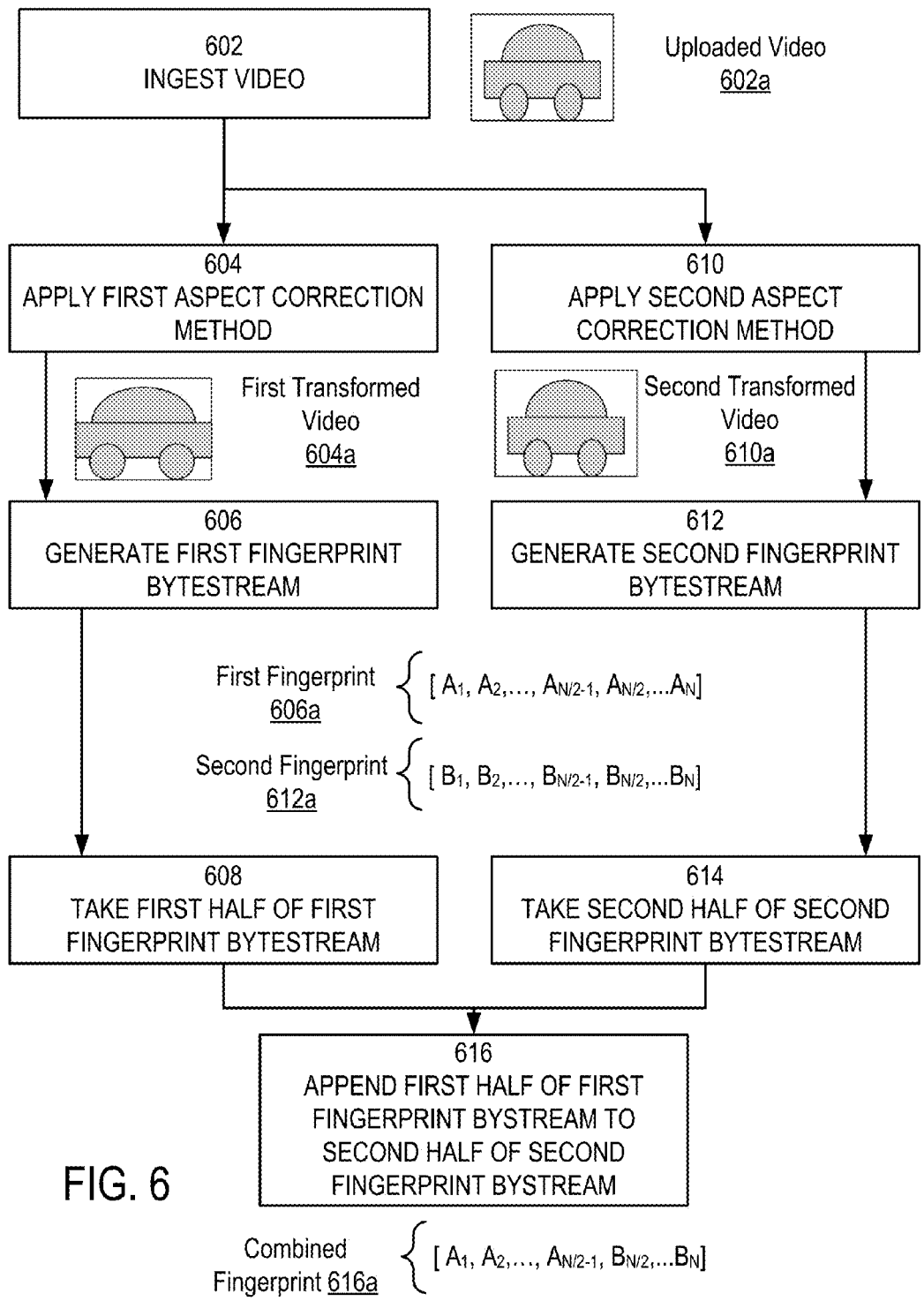
FIG. 6 illustrates the creation of a combined video fingerprint that will match near-identical videos of different aspect ratios or formats.

FIG. 6 describes the creation of combined fingerprints using the combined fingerprint generator 160. Given an uploaded video 602a for processing, a combined fingerprint 616a can be created to match the video against near-duplicates, including near duplicates of different aspect ratios or formats. The generated combined fingerprint 616a can be stored in the fingerprint database 155.

In existing video hosting services 100, users will most often upload videos in 4:3 (full-screen) or 16:9, 2.35:1, 2.4:1 (widescreen) aspect ratio formats. Sometimes, however, users will upload videos in a 4:3 aspect ratio format that compresses a widescreen video into a full-screen size by distorting the image (squashed). Squashed videos are recognizable because characters and objects in the video appear thinner relative to their ordinary full-screen or widescreen counterparts. In order to improve the matching ability of the video hosting service 100, the fingerprinting server 115 is capable of generating and matching videos of all aspect ratios, including at least the common formats described above.

Existing fingerprint systems, however, cannot successfully match near-identical copies of videos of all three of these common formats with a fingerprint created based on only one of these formats. There are several issues that must be dealt with in order to properly match videos of varying aspect ratios and formats. First, two videos might have both different formats and also different aspect ratios. For example, a widescreen video of aspect ratio 16:9 has more video content on the left and right sides of the video than a full-screen video of aspect ratio 4:3. Full-screen videos prevent the compression effects seen in squashed videos by cutting out some left and right side content that is not crucial to a viewing of the video. The result, however, is that a fingerprints created using the widescreen version of a video as a baseline will not match fingerprints created using the full-screen version because the content of the video is different for each version.

One method of matching a widescreen video to a full-screen video is to perform an aspect correction method on any widescreen video before creating a fingerprint for it. This aspect correction method, known as a "widescreen adjust" involves detecting a widescreen video based on its 16:9, 2.35:1 or 2.4:1 aspect ratio, and cropping off the left and right sides of the video before creating the fingerprint. Widescreen adjust keeps the center content of a video by cropping off two vertical columns of pixels that run the entire height of the video, from each side of the video, where each column is one-eighth of the width of the video. Widescreen adjust converts a 16:9 aspect ratio to a 4:3 aspect ratio with a full-screen format. This way, the fingerprint for a widescreen video will be based on the same content as for the full-screen video fingerprint, and as a result the fingerprints will match.

Second, two videos might have the same format, but different aspect ratios. For example, a widescreen video has an aspect ratio of 16:9, 2.35:1 or 2.4:1 whereas a squashed video has an aspect ratio of 4:3. They both have the same format, however, because all of the content in the widescreen version is present in the squashed version, it has simply been "squashed" into the narrower 4:3 window size. As a result, a fingerprint created using either the squashed video or the widescreen video as a baseline will match both types of video, since the video content is the same in both instances. In this case, no aspect correction method is needed as the content in each video is already the same and thus the fingerprints created will be the same.

Third, two videos might have the same aspect ratio, but differ in format. This is the case when matching a full-screen video to a squashed video. In the full-screen vs. squashed video case, even though the aspect ratio is the same, the format is different as content that has been cropped out of the full-screen version is present in the squashed version. Since the content of the videos is different, fingerprints created for the full-screen and squashed videos will be different. Since the fingerprints are different, the fingerprints will not match against each other even though they are of the same video. Performing a "widescreen adjust" is not possible in this instance because the aspect ratio is the same for both the squashed and full-screen videos, and thus the videos are indistinguishable.

Based on the above cases of widescreen, full-screen, and squashed videos, it can be seen that widescreen fingerprints can match squashed fingerprints, and that widescreen fingerprints can match full-screen fingerprints after a transformation. However, the fingerprints created in each instance will be different: the widescreen-squashed fingerprint will be based on side content of the video, whereas the widescreen-full-screen fingerprint will not be based on the side content as explained above. Thus, no single fingerprint can be created to match all three aspect ratios and formats.

In order to match near-duplicate widescreen, full-screen, or squashed videos, the combined fingerprint generator 160 creates and combines half of each of two different video fingerprints. The video fingerprints are robust enough such that only half of the fingerprint bytestream is necessary to match near-duplicate videos to a high threshold. Any robust video fingerprinting system can be used to generate a combined fingerprint, so long as the fingerprinting system creates fingerprints that can be found to match based on half of the full entries. This covers many robust fingerprinting approaches, since a level of mismatch tolerance is built into the fingerprint matching, by design. Examples span the full range of fingerprinting approaches that are compatible with a locality-sensitive hashing (LSH) approach to retrieval, since LSH itself explicitly relies on matching only a fraction of the full fingerprint.

The combined fingerprint generator 160 executes a transformation strategy. A transformation strategy involves using two different aspect correction methods so that all combined fingerprints that are created will be able to match all three aspect ratios and formats (widescreen, squashed, and full-screen). Three aspect correction methods are described, however, the combined fingerprinting system will work with any other aspect correction method which maps one aspect ratio or format into another aspect ratio or format such that the resulting combined fingerprints match all three aspect ratios and formats.

The widescreen adjust aspect correction method converts a widescreen video to a 4:3 full-screen video by cropping off the left and right sides of a widescreen format video as described above. If the uploaded video 602a is not a widescreen video, however, the widescreen adjust aspect correction method performs no action on the uploaded video 602a.

The anti-squash aspect correction method converts a widescreen video and a 4:3 video (of either squashed or full-screen variety since the two are indistinguishable) to a 4:3 sized video by cropping off the sides from all sized videos. Similarly to widescreen adjust, anti-squash adjust keeps the center content of a video by cropping off two vertical columns of pixels that run the entire height of the video, from each side of the video, where each column is one-eighth of the width of the video. However, widescreen adjust and antisquash differ in that antisquash adjust converts more than just widescreen aspect ratios. Antisquash adjust converts a 16:9 aspect ratio to a 4:3 aspect ratio with a full-screen format, a 4:3 squashed video to a 3:3 aspect ratio with a full-screen format, and a 4:3 full-screen video to a 3:3 aspect ratio with a format that is missing additional side content than in the full-screen case. After this transform, the resulting fingerprint will now match the widescreen and squashed videos, as both contain the same remaining content. This second transform will not match, however, full-screen video as the transform will have cropped some additional side content out of the picture that is still present in the other two types of video.

Another aspect correction method is to simply perform no adjustment to the video, and pass through the uploaded video as is. In this case, the resulting fingerprint will match widescreen and squashed video, as both contain the same content. Again, here resulting fingerprint will not match the full-screen video as the full-screen video lacks some side content that is present in the other two types of video.

Regardless of which aspect correction method is chosen, the transformed video is converted to a format of fixed height and width before the fingerprint is created.

Each of the three aspect correction methods described above will result in a fingerprint that matches two of the three common aspect ratios and formats. Implementing a transformation strategy requires choosing two different aspect correction methods so that all three common aspect ratios and formats (widescreen, full-screen, and squashed) will match at least one half of the combined fingerprint. The transformation strategy can then be applied to all uploaded videos, as the resulting fingerprint will match all aspect ratios and formats. For each uploaded video, a first and second transformed video is created using the two aspect correction methods. Two fingerprints are then created using the two transformed videos and the fingerprinting generator 130. A combined fingerprint 616a is then created using half of each of the two fingerprints that were created using the two transformed videos.

Implementing a transformation strategy, however, does not involve choosing any two transformation methods at random. Since each aspect correction method will only match two of the three common aspect ratios and formats, the aspect correction methods must be selected so that together they cover all three aspect ratios and formats. The table below outlines the aspect correction methods and the transformation strategies that can be implemented using those aspect correction methods.

TABLE 1

Transformation Strategy Table

| Video Aspect Ratio | Strategy 1 [Widescreen Adjust, No Adjust] | Strategy 2 [Widescreen Adjust, Anti-Squash Adjust] |
| --- | --- | --- |
| 16 × 9 Widescreen | [4 × 3, 16 × 9] Fingerprint Fingerprint Matches: 16 × 9: second half match 4 × 3: first half match 4 × 3 SQ: second half match | [4 × 3, 4 × 3] Fingerprint Fingerprint Matches: 16 × 9: no match 4 × 3: full match 4 × 3 SQ: no match |
| 4 × 3 Full-Screen | [4 × 3, 4 × 3] Fingerprint Fingerprint Matches: 16 × 9: N/A 4 × 3: full match 4 × 3 SQ: N/A | [4 × 3, 3 × 3] Fingerprint Fingerprint Matches: 16 × 9: N/A 4 × 3: first half match 4 × 3 SQ: N/A |
| 4 × 3 SQ (Squashed) | [4 × 3 SQ, 4 × 3 SQ] Fingerprint Fingerprint Matches: 16 × 9: full match 4 × 3: no match 4 × 3 SQ: full match | [4 × 3 SQ, 3 × 3] Fingerprint Fingerprint Matches: 16 × 9: first half match 4 × 3: second half match 4 × 3 SQ: first half match |

The first transformation strategy ("Strategy 1") is to perform a widescreen adjust to a video in order to obtain one half of the combined fingerprint 616a, and to leave the uploaded video 602a unmodified in order to obtain the other half of the combined fingerprint 616a.

The second transformation strategy ("Strategy 2") is to perform a widescreen adjust in order to obtain one half of the combined fingerprint 616a, and to perform an antisquash adjust in order to obtain the other half of the combined fingerprint 616a.

A transformation strategy that would not be able to match all three aspect ratios and formats is to perform an antisquash adjust in order to obtain one half of the combined fingerprint 616a, and to leave the uploaded video 602a unmodified in order to obtain the other half of the combined fingerprint 616a. This strategy is insufficient because the resulting combined fingerprint 616a would not be able to match a full-screen video.

Whether to use a transformation strategy with an antisquash adjust over a strategy that performs no adjustment to the video for one half of the fingerprint depends on the needs of the video hosting service 100. A legacy system for fingerprinting videos might be using either of these transforms already as part of the fingerprinting system, for example as a baseline transform before any fingerprinting is performed. Using previously existing fingerprints to create combined fingerprints saves the costs that would be associated with re-fingerprinting all existing videos in the system.

In the case of the legacy system, the transformation strategy still requires two aspect correction methods, however one of those aspect correction methods is the one currently in use by the legacy system. The other aspect correction method, as above, is chosen so that the combined fingerprint 616a is able to match all three aspect ratios and formats. The transformation strategy can then be applied to all uploaded videos. For each uploaded video, a transformed video is created using the aspect correction method that was not part of the legacy system. One fingerprint is then created using the transformed video and the fingerprinting generator. Rather than creating the second fingerprint from scratch and duplicating work already performed by the legacy system, the second fingerprint is retrieved from the fingerprint database 155. A combined fingerprint 616a is then created using half of each of those two fingerprints.

FIG. 6 describes the generation of a single combined fingerprint 616a. FIG. 6 makes use of transformation Strategy 1 from Table 1 above, where a widescreen adjust is used for one half of the combined fingerprint 616a and no adjustment is used for the other half of the combined fingerprint 616a. The combined fingerprint generator 160 creates a combined fingerprint by first determining 602 the aspect ratio of an uploaded video 602a. Next, a first aspect correction method is applied 604 to the uploaded video 602a. After applying the first aspect correction method 604, the result is first transformed video 604a. If the uploaded video 602a was widescreen, the first transformed video 604a will be in the full-screen format with the side content of the video cropped off.

The first transformed video 604a is input into the subfingerprint generator 120. In the manner described above, the fingerprint generator 130 generates 606a a first fingerprint of the first transformed video 604a. The first fingerprint 606a comprises a bytestream vector comprising n entries wherein each entry encodes which version of which bin 340 resulted in the smallest hash function output for the corresponding seed, as described above. The first fingerprint bytestream is divided 608 in half, with the first half being retained, and the second half discarded. As a very simplified example, in the example shown in FIG. 6, the first fingerprint is $[A_1, A_2, \ldots A_{N/2-1}, A_{N/2}, \ldots, A_N]$, and the so the first half $[A_1, A_2, \ldots A_{N/2-1}]$ is retained.

With the first half of the combined fingerprint 616a has been created, the second aspect correction method is applied 610 to the uploaded video 602a resulting in the second transformed video 610a. Following the example transformation strategy describe above, FIG. 6 shows the second transformed video 610a after no adjustment was performed. Thus, the second transformed video 610a is identical, in this instance, to the uploaded video 602a. Next, a second fingerprint 612a is created 612 by the fingerprint generator 130. The second fingerprint 612a bytestream is divided 614 in half, and this time the second half of the bytestream is retained, and the first half is discarded. Continuing the example in FIG. 6, the second fingerprint 612a is $[B_1, B_2, \ldots B_{N/2-1}, B_{N/2}, \ldots, B_N]$ and the second half thereof $[B_{N/2}, \ldots, B_N]$ is retained.

The selection of which half a fingerprint to retain for use in the combined fingerprint is flexible. Which portion of each fingerprint is used in the combined fingerprint is irrelevant as long as the each fingerprint contributes a different half, and the order of the halves is preserved by the concatenation operation. For example, when the first fingerprint 604a bytestream is divided 608 in half, the second half can be retained and the first half can be discarded. If this is done instead, when the second fingerprint 612a bytestream is divided 614, the first half of the second fingerprint 612a is retained and the second half of the second fingerprint 612a is discarded. Thus, when dividing the two fingerprints, the first half cannot be discarded for both fingerprints and the second half cannot be retained for both fingerprints.

In the case where a legacy fingerprinting system is providing one of the fingerprints, the applying 610 of the second aspect correction method can be skipped, and generating 612 the second fingerprint 612a bytestream is replaced with retrieving the second fingerprint 612a bytestream from the fingerprint database 155 instead.

The first half of the first fingerprint 606a is then combined 616 with the second half of the second fingerprint 612a, for example by concatenating the two halves together. Continuing the example in FIG. 6, the combined fingerprint 616a is $[A_1, A_2, \ldots A_{N/2-1}, B_{N/2}, \ldots, B_N]$. Alternately, the first half of the second fingerprint 612a can be combined 616 with the second half of the first fingerprint 606a.

The result is a combined fingerprint 616a which can match near-duplicate widescreen, full-screen, and squashed videos. Completing the example in FIG. 6, if the first aspect correction method is a widescreen adjust and the second aspect correction method is to perform no adjustment to the uploaded video 602a, the first half of the combined fingerprint 616a bytestream will match near-duplicate widescreen and full-screen videos, and the second half of the combined fingerprint 612a bytestream will match widescreen and squashed videos.

Clustering

Figures 5A, 5B:
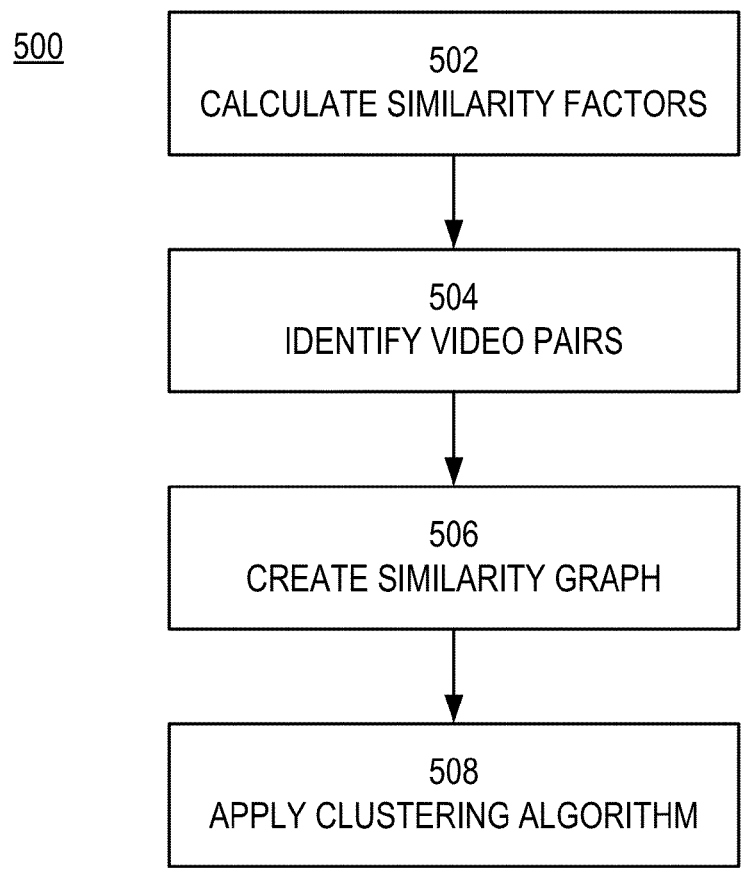
FIG. 5A illustrates one embodiment of a method for generating clusters of videos based on video fingerprints for the videos.
FIG. 5B illustrates video fingerprints for a video in accordance with one embodiment.

The clustering module 135 detects near-duplicate videos 202 in the video database 140 based on the corresponding video fingerprints 450 stored in the fingerprint database 155. The clustering module 135 processes the fingerprints 450 in the fingerprint database 155 to generate a plurality of clusters, each cluster representing a group of similar videos. FIG. 5A illustrates a flowchart of one embodiment of a clustering procedure 500 implemented by the clustering module 135. Other embodiments can perform one or more steps of the clustering procedure 500 in a different sequence. Moreover, other embodiments of the clustering procedure 500 can include additional, fewer, and/or different steps than the ones described herein.

The clustering module 135 compares video fingerprints 450 for two videos 202 by calculating 502 a similarity factor for the video pair. In one embodiment, the similarity factor for a video pair is a variation of a Hamming distance metric calculated 502 based on the corresponding video fingerprints 450. Each video fingerprint 450 has multiple entries. The clustering module 135 evaluates two video fingerprints 450 and determines a percentage of their entries that match. For example, the clustering module 135 determines how many matching entries are included in the fingerprints 450 being evaluated and divides the number of matching entries by the number of entries included in each fingerprint 450.

To help further explain calculation 502 of a similarity factor, FIG. 5B illustrates an example of a first video fingerprint 450a and an example of a second video fingerprint 450b. The first fingerprint 450a and the second fingerprint 450b both comprise four entries. The second and third entries in the two fingerprints 450a, 450b are equivalent. Thus, there are two matches for the fingerprints 450a, 450b. The clustering module 135 can therefore calculate 502 a similarity factor for the two fingerprints 450a, 450b of 0.50, 50%, or some other equivalent.

After calculating 502 similarity factors for all pairs of videos 202 stored in the video database 140 based on the corresponding video fingerprints 450 stored in the fingerprint database 155, the clustering module 135 identifies 504 those video pairs having a similarity factor above a threshold. In one embodiment, the clustering module 135 employs a locality-sensitive hashing (LSH) algorithm to identify 504 the sufficiently similar videos. Other conventional matching techniques suitable for identifying 504 similar items within large quantities of data to, such as nearest neighbor search techniques based on kd-trees or spill trees, can also be utilized by the clustering module 135.

Based on the identified 504 video pairs, the clustering module 135 creates 506 a similarity graph comprising nodes corresponding to videos 202 and edges between the nodes that signify a similarity between the connected videos 202. In one embodiment, all edges have equal significance, and the presence of an edge between two videos 202 simply indicates that the calculated 502 similarity factor for the two videos 202 exceeded the threshold. The clustering module 135 can also create 506 a similarity graph comprising edges between pairs of videos 202 whose similarity factor does not exceed the threshold. For example, if video A is sufficiently similar to video B, and video B is sufficiently similar to video C, and edge can be included between video A and video C even if their calculated 502 similarity factor is below the threshold. Edges within the created 506 graph can also be weighted based on the corresponding similarity factor (e.g., the weight of an edge is proportion to the corresponding similarity factor).

The clustering module 135 then applies 508 a clustering algorithm to the videos 202. In one embodiment, the clustering module 135 applies a leader clustering algorithm. Leader clustering comprises arranging the videos 202 in a sequence, the sequence based on any suitable attribute (e.g., alphabetical by title, sequential by date and time of upload, sequential by duration, etc.). Once the videos 202 are arranged, the first video 202 is placed into a first cluster with all videos 202 to which the first video 202 is sufficiently similar. The videos 202 included in the first cluster are removed from the sequence. This process of assigning videos 202 to clusters is repeated until the sequence is empty. In one embodiment, the clustering module 135 assigns a unique cluster ID to each generated cluster Once the set of clusters has been generated by the clustering module 135, each video 202 ingested by the video hosting service 100 can be analyzed to see if it corresponds to one of the previously generated clusters by generating a fingerprint 450 for the ingested video 202 as described above and comparing the fingerprint 450 to previously generated fingerprints 450. The clustering module 135 can then append or modify metadata associated with the video 202 to indicate if it is a near-duplicate video and, if so, identify which other videos 202 for which it is a near duplicate. For example, the clustering module 135 can modify the metadata to include a cluster ID associated with one of the previously generated clusters.

As previously described, such metadata can help the video hosting service 100, for example, provide improved searching and browsing capabilities (e.g., by not presenting to the user an excessive number of near-duplicate results in response to a query), propagate metadata among videos 202, or identify videos 202 as suitable for various management policies (e.g., videos 202 suitable for monetization via a particular advertisement or subscription policy, videos 202 which should be eliminated from the database, etc.).

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating combined video fingerprints through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a combined fingerprint of a video, the method executed by at least one computer system comprising a processor and a computer-readable storage medium, the method comprising:
   generating a first transformed video by applying a first aspect correction method to the video;
   generating a second transformed video by applying a second aspect correction method to the video;
   generating a first fingerprint using the first transformed video, the first fingerprint having a first half and a second half;
   generating a second fingerprint using the second transformed video, the second fingerprint having a first half and a second half;
   combining the first half of the first fingerprint with the second half of the second fingerprint to generate the combined fingerprint; and
   storing the combined fingerprint in the computer-readable storage medium.

2. The method of claim 1, wherein the first aspect correction method is a widescreen adjustment, and the second aspect correction method is an antisquash adjustment, or the reverse.

3. The method of claim 1, wherein the first aspect correction method is a widescreen adjustment, and the second aspect correction method is leaving the video unadjusted, or the reverse.

4. The method of claim 1, wherein the first aspect correction method converts a first aspect ratio to a second aspect ratio, and the second aspect correction method converts a third aspect ratio to the first or the second aspect ratio, or the reverse.

5. The method of claim 1, wherein the combining further comprises concatenating the first half of the first fingerprint with the second half of the second fingerprint.

6. The method of claim 1, further comprising:
   assigning the video to a cluster of videos based on the combined fingerprint;
   calculating a number of matching entries for the combined fingerprint for the video and a second fingerprint for a second video.

7. A method for generating a combined fingerprint of a video, the method executed by at least one computer system comprising a processor and a computer-readable storage medium, the method comprising:

generating a first transformed video by applying a first aspect correction method to the video;

generating a first fingerprint using the first transformed video, the first fingerprint having a first half and a second half;

retrieving a second fingerprint from the computer-readable storage medium, the second fingerprint based on a second aspect correction method and having a first half and a second half;

combining the first half of the first fingerprint with the second half of the second fingerprint to generate the combined fingerprint; and storing the combined fingerprint in the computer-readable storage medium.

8. The method of claim 7, wherein the first aspect correction method is a widescreen adjustment, and the second aspect correction method is an antisquash adjustment, or the reverse.

9. The method of claim 7, wherein the first aspect correction method is a widescreen adjustment, and the second aspect correction method is leaving the video unadjusted, or the reverse.

10. The method of claim 7 wherein the first aspect correction method converts a first aspect ratio to a second aspect ratio, and the second aspect correction method converts a third aspect ratio to the first or the second aspect ratio, or the reverse.

11. The method of claim 7, wherein the combining further comprises concatenating the first half of the first fingerprint with the second half of the second fingerprint.

12. The method of claim 7, further comprising:

assigning the video to a cluster of videos based on the combined fingerprint;

calculating a number of matching entries for the combined fingerprint for the video and a second fingerprint for a second video.

13. A system for generating a combined fingerprint of a video, the system contained within a computer program product embodied on a non-transitory computer-readable storage medium and executed by a processor, the system further comprising:

a combined fingerprint generator, wherein the combined fingerprint generator comprises:

a transformation strategy comprising a first and a second aspect correction method; and a video transformation module that takes as input the first and second aspect correction method and the video and creates as output a first and second transformed video;

a fingerprint generator that takes as input a first and a second transformed video and creates as output a first and a second fingerprint, the first and second fingerprints each having a first half and a second half;

wherein the combined fingerprint generator further comprises a combination module for combining a first half of the first fingerprint with a second half of the second fingerprint to generate a combined fingerprint;

a fingerprint database for storing the combined fingerprint.

14. The system of claim 13, wherein the first aspect correction method is a widescreen adjustment, and the second aspect correction method is an antisquash adjustment, or the reverse.

15. The system of claim 13, wherein the first aspect correction method is a widescreen adjustment, and the second aspect correction method is leaving the video unadjusted, or the reverse.

16. The system of claim 13, wherein the first aspect correction method converts a first aspect ratio to a second aspect ratio, and the second aspect correction method converts a third aspect ratio to the first or the second aspect ratio, or the reverse.

17. The system of claim 13, wherein the combination module combines the first and second fingerprints by concatenating the first half of the first fingerprint with the second half of the second fingerprint.

18. The system of claim 13, further comprises a cluster module, wherein the cluster module:

assigns the video to a cluster of videos based on the combined fingerprint;

calculates a number of matching entries for the combined fingerprint for the video and a second fingerprint for a second video.

* * * * *